METHOD OF AND APPARATUS FOR STACKING SHEETS

Original Filed June 7, 1963 6 Sheets-Sheet 1

INVENTOR.
Wilbur J. Hoffswell,
BY
Hofgren, Brady, Wegner,
Allen & Stellman Attys.

METHOD OF AND APPARATUS FOR STACKING SHEETS

Original Filed June 7, 1963 6 Sheets-Sheet 2

METHOD OF AND APPARATUS FOR STACKING SHEETS

Original Filed June 7, 1963 6 Sheets-Sheet 3

METHOD OF AND APPARATUS FOR STACKING SHEETS

Original Filed June 7, 1963 6 Sheets-Sheet 4

METHOD OF AND APPARATUS FOR STACKING SHEETS

Original Filed June 7, 1963 6 Sheets-Sheet 5

METHOD OF AND APPARATUS FOR STACKING SHEETS

Original Filed June 7, 1963 6 Sheets-Sheet 6

Inventor:
Wilbur J. Hoffswell
By: Hofgren, Wegner, Allen, Stellman & McCord
Attorneys United States Patent Office Re. 26,004
Reissued Apr. 26, 1966

26,004

METHOD OF AND APPARATUS FOR STACKING SHEETS

Wilbur J. Hoffswell, West Chicago, Ill., assignor to R. R. Donnelley & Sons Company, a corporation of Delaware Original No. 3,182,996, dated May 11, 1965, Ser. No. 288,853, June 7, 1963. Application for reissue Aug. 31, 1965, Ser. No. 485,671
32 Claims. (Cl. 271—68)

Matter enclosed in heavy brackets [ ] appears in the original patent but forms no part of this reissue specification; matter printed in italics indicates the additions made by reissue.

This application is a reissue application of U.S. Patent No. 3,182,996, dated May 11, 1965, which application was a continuation-in-part of my copending application 101,518 filed April 2, 1961, now abandoned, which in turn was a continuation-in-part of my application Serial No. 6,789, filed February 4, 1960, now abandoned, and copending with 101,518.

This invention relates to a method of stacking thin flexible sheets such as paper signatures, and to apparatus for stacking such sheets according to the principles of the method. A signature may be defined as a printed paper sheet containing a number of pages, usually in multiples of two, such as two, four, eight, or sixteen, which when folded as a unit forms a section of a book, pamphlet or magazine. The terms "paper sheets" and "sheets" will be used herein to include sheets folded into signatures, and to exclude any sheets, whether of paper or other material, which, while flexible, are of sufficient thickness to be more rigid than the paper customarily used for high grade magazines and books.

It is a general object of the invention to provide a new and improved method of stacking paper sheets.

Another object is to provide a new and improved apparatus for stacking paper sheets.

Paper sheets must be gathered for binding into a book, and various methods and types of apparatus have been used to stack, or pack the paper sheets which are customarily delivered from a web printing, folding and cutting apparatus onto a generally horizontal moving conveyor in a shingled stream with leading portions of individual sheets in advance of the leading edges of succeeding sheets and with the trailing edges of individual sheets underlying succeeding sheets.

The simplest installations merely include an upwardly inclined receiving plate at the delivery end of the conveyor on which the sheets stop with trailing sheets forced partly over the leading sheets. This arrangement has the disadvantage that the leading and trailing edges of the sheets are not aligned on the receiving plate, and an attendant must take a shingled batch of sheets from the receiving plate and jog the ends of the sheets on a table to approximately align their edges so that they are properly stacked for further use.

It is quite apparent that if paper sheets are to be stacked other than in a roughly shingled batch they must be stacked vertically or packed horizontally on edge. The layboy type of device for stacking sheets delivers them onto a descending table; and when a stack of sheets is to be lifted from the table, either manually or mechanically, some type of temporary support must receive the incoming sheets while the stack beneath them is removed from the table. This obviously requires relatively complex mechanism and a good deal of space.

A flystick packer box may be used to pack sheets on edge on a table but this also requires a relatively complex mechanism with very careful control over delivery of the sheets into the path of a horizontally reciprocating flystick which pushes them onto the table. An operator still has the problem of segregating a batch of sheets from the pack and turning the batch 90° to stack them on a table or storage platform.

Any attempt to slide shingled sheets on one another to form a vertical stack in which the edges are substantially aligned requires that the more rearward sheets be pushed either over or under those ahead of them. The former arrangement has all the disadvantages of a layboy, and is basically less practical.

On theoretical considerations the simplest apparatus for forming a vertical stack of sheets should operate by forming a shingled stream in which the leading edge of each sheet is beneath the preceding sheet and the trailing edge projects behind that of the preceding sheet, and abutting successive sheets against a stop so that trailing signatures feed under the leading signatures to form the stack. This arrangement requires no moving tables to maintain the top of the stack level with the delivery mechanism, nor does it require a reciprocating flystick with the problems of timing inherent in such a unit. As the stack builds from the bottom up an attendant may pick a batch of sheets off the top of the forming stack with no interruption of the stacking operation and no special mechanism required.

However, until the present invention it has been thought impractical to add paper sheets to the bottom of a stack because of the limp, pliable nature of such sheets. The prior art shows underfeed stackers for relatively rigid objects such as boxboard blanks and the like, but prior to the present invention there has been no known device for forming a vertical stack from a shingled stream of sheets by underfeeding.

In acordance with the method of the present invention the shingled stream of sheets from a folder is carried around an inverting drum so that, instead of having their leading edges exposed and the trailing edge of a sheet beneath the trailing portion of the succeeding sheet, the leading edge of each sheet is beneath the forward porpion of the next preceding sheet and the trailing edge of the sheet is exposed behind the trailing edge of the preceding sheet and overlies the next succeeding sheet. This automatically places the signatures in such a relationship that they may be abutted against a stop to slide the lower sheets underneath the sheets above them, so as to form a vertical stack by underfeeding.

The stacker of the present invention, in addition to the advantage of great simplicity of mechanism, also has the advantage of being extraordinarly compact. Since the sheets are carried around an inverting drum their path doubles back upon itself, and the total amount of space needed is little more than one and one-half times the length of the sheets being stacked.

During development of the present apparatus it was at one time thought that the sheets must be arched longitudinally so as to give them enough rigidity to permit underfeeding of sheets into the stack. There is no doubt that arching the sheets is advantageous, because it helps stabilize them laterally and does rigidify them so that they are better able to stand the stress of sliding beneath the stack and into abutment with the stop plate. However, it has now been determined that the apparatus forms a satisfactory stack, and with substantially no jamming or damage to the sheets, even if the sheets are not longitudinally arched in the stacking area.

Careful analysis of the apparatus of the present invention now shows that there are three primary factors which contribute to the successful operation of the apparatus.

In the first place, the sheets are effectively continuously supported from the time they pass around an inverting drum until they are completely in the stack and abutted against the stop plate.

In the second place, the shingled sheets are compressed as they enter the stack so that the sheets in the shingled stream form a compressed wedge at the line of entry.

In the third place, the sheets in the shingled stream are urged continuously forwardly beneath the forming stack so that each sheet is driven positively against the stop.

The compressing of the shingled stream of sheets and the positive feed are accomplished by a small feedroll which is substantially in contact with the rear edge of the forming stack and is spring urged downwardly to compress the shingled stream. This feedroll is preferably positively driven but may also be friction driven.

Sheets in the shingled stream travel without relative motion between them until a leading sheet in the stream strikes the stop. It is apparent that at this point in the operation the frictional drag between the last stopped sheet and the next sheet beneath it must be broken so that the next sheet may slide forward against the stop. The feedroll bears upon the projecting trailing edge of each sheet when the last sheet above it strikes the stop, so that the feedroll, in cooperation with the moving belts upon which the shingled stream is supported and moved forward, breaks the frictional drag between the last stopped sheet in the stack and the next sheet entering the stack.

It is apparent from the foregoing description of the relative movement between the sheets during stack formation that the stacker of the present invention operates most satisfactorily with sheets of coated paper; but uncoated calendered or super-calendered paper will also stack satisfactorily if one of the well known dry lubricants is used to decrease frictional resistance between the sheets.

In a preferred arrangement of the present invention folded sheets are delivered from a web printing, folding and cutting apparatus onto a generally horizontal moving conveyor at a rate with reference to the speed of the conveyor such that the sheets are arranged in a shingled stream with leading portions of individual sheets in advance of the leading edges of succeeding sheets and with the trailing edges of individual sheets underlying succeeding sheets. Each sheet trails the preceding one by about 5/16 inch. The conveyor delivers the shingled stream of sheets to a transfer drum which inverts the advancing stream and reverse its direction of motion, so that the trailing edges of individual sheets overlie succeeding sheets. The transfer means delivers the shingled stream of signatures to a stacking apparatus including a center belt and flanking belts inclined downwardly relative to the center belt so that the shingled stream of signatures is progressively arched over the center belt. This gives the individual signatures greater longitudinal rigidity than is possible if they remain in a planar condition.

In a preferred embodiment of the apparatus, a jogging means is provided alongside the first conveyor mentioned for aligning the lateral edges of the sheets in the shingled stream progressively as the stream passes the jogging means. So long as the sheets remain assembled in the shingled stream, there is substantially no tendency to lose the lateral alignment thus provided. A stack is thereby provided in which all the edges of the signatures are aligned with the corresponding edges of the other signatures.

In an alternative arrangement the belts which carry the sheets into the stacking area are all in the same horizontal plane, and the sheets are not arched.

The invention is illustrated in a preferred and an alternative embodiment in the accompanying drawings, in which.

Figures 1, 1A:
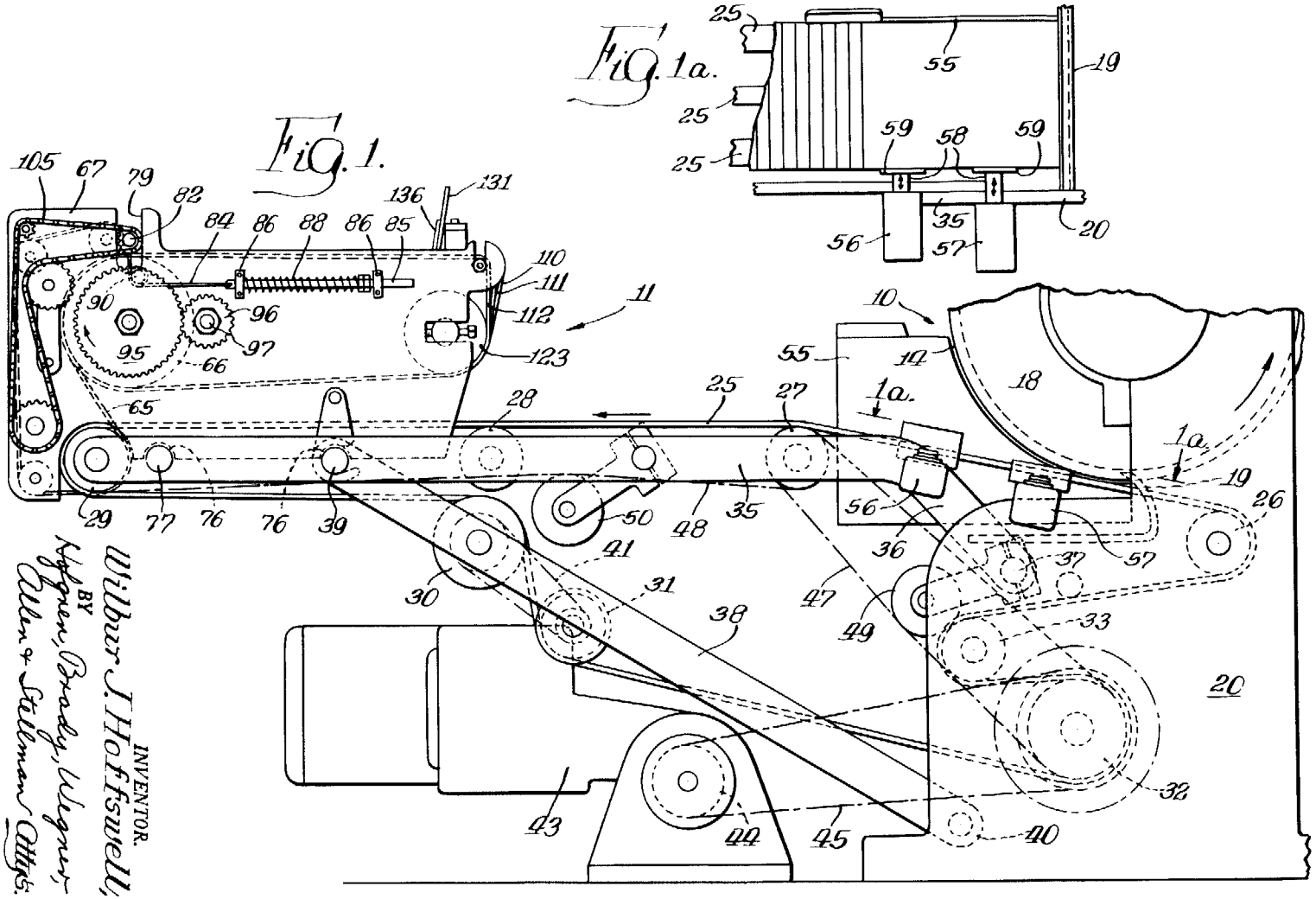
FIG. 1 is a front elevational view including a fragmentary showing of web printing, folding and cutting apparatus for delivering sheets in the form of folded signatures to stacking apparatus embodying the principles of the present invention, and is illustrative of both the preferred and alternative embodiments.
FIG. 1a is a fragmentary plan view, taken at about the line 1a—1a of FIG. 1.

Referring to the drawings in greater detail, the principles of the invention are illustrated in connection with an installation including a web feeding, printing, folding and cutting machine illustrated in part at 10 in FIG. 1 which delivers sheets in the form of signatures to a sheet stacking apparatus 11. The machine 10 may be conventional and is illustrated and described herein only to the extent necessary to enable an understanding of how signatures are delivered to the stacking apparatus 11.

In the machine 10, a web of indefinite length is printed, passed over a formed board which folds it along a longitudinal center line, thereafter cut into individual lengths, and finally passed in a vertical direction to a drum 14 rotating in a counterclockwise direction as viewed in FIG. 1. The drum 14 preferably includes gripper means (not shown) for grasping the sheets for travel with the drum for part of a revolution after which the grippers are actuated to release the sheets to drop onto a conveyor 18. Preferably, release of the individual sheets from the drum 14 and the grippers is aided by strippers 19. The rotating drum 14 may be supported by a suitable framework including side frame members illustrated in part at 20 and is driven at a high rate of speed by a suitable drive mechanism (not shown).

The conveyor 18 includes laterally spaced (FIG. 2) parallel conveyor belts 25 which are trained about supporting rolls 26, 27, 28, 29, 30, 31, 32 and 33. It will be understood on viewing FIG. 1 that the rolls supporting the conveyor belts 25 provide for an upwardly inclined reach from the roll 26 to the roll 27, and a substantially horizontal reach from the roll 27 to the roll 28 and to the roll 29. The upwardly inclined reach between the rolls 26 and 27 is disposed directly beneath the associated drum 14 so that as the drum rotates in a counterclockwise direction as viewed in FIG. 1, and the uppper reaches of the conveyor belts travel toward the left as viewed in FIG. 1, folded sheets are deposited by the drum on the conveyor in a shingled stream, with leading portions of individual sheets in advance of the leading edges of succeeding sheets and with the trailing edges of individual sheets underlying the succeeding sheets, as illustrated diagrammatically in FIG. 7.

The rolls 26, 32 and 33 of the conveyor 18 are supported on the framework of the machine 10 including side plate 20. The rolls 27, 28 and 29 of the conveyor 18 are supported by a pair of rather long arms 35, one visible in FIG. 1, each including a downwardly extending portion 36 secured to the framework 20 at 37, and each including an outboard portion supported by an inclined brace member 38 having one end attached to the associated arm at 39 and a lower end suitably attached to the framework 20 at 40. Rolls 30 and 31 are supported on the diagonal braces 38, the latter rolls through the medium of adjustable arms 41 clamped in position so that the rolls tension the belts.

The conveyor 18 is preferably driven by means of a chain and sprocket drive mechanism including a drive motor 43 having a drive sprocket 44 with a claim 45 trained thereabout and trained about a sprocket mounted for rotation with the conveyor roll 32. Also mounted for rotation with the roll 32 is a sprocket having a chain 47 trained thereabout and passing around a sprocket mounted for rotation with the roll 27 to drive the latter. In turn, another sprocket mounted for rotation with the roll 27 has a chain 48 passing therearound and also passing about a sprocket mounted for rotation with the roll 29. Chains 47 and 48 may be tensioned by sprockets 49 and 50, respectively.

In order to provide for alignment of the side edges of the stream, the conveyor 18 which receives the sheets in a shingled arrangement from the drum 14 is flanked by side jogger means which repeatedly bump the sides of the passing stream to progressively align the side edges of the sheets. The jogger means comprises an aligning plate 55 (FIGS. 1 and 1a) positioned immediately adjacent the path of the shingled stream of sheets on the conveyor. At the opposite side of the conveyor a pair of vibrators or joggers 56 and 57 are provided, and each of these may comprise a suitable electric motor or air motor (not visible) having drive means connected to a reciprocable bar 58 that has a flat platelike member 59 adapted to engage the side edges of sheets in the shingled stream passing on the conveyor 18. As the motors are driven, the plates 59 are reciprocated and repeatedly bump the side edges of the sheets to align the latter against the plate 55. If desired, the installation may include additional side jogger means positioned between the jogger means illustrated and the station at which the stream of sheets is transferred from the belts 25 to the stacker proper.

The shingled stream of sheets is advanced bodily in the direction of its length by the conveyor belts 25 from a receiving station immediately beneath the drum 14 to a transfer station adjacent the belt supporting roll 29. At the transfer station, a pair of spaced parallel transfer belts 65 are disposed between the belts 25. The endless transfer belts are trained about the roll 29, incline upwardly toward a transfer drum (FIGS. 2, 5 and 7) at a relatively small angle from the vertical, pass part way around the transfer drum from a lower portion thereof to the top side thereof, then pass around separate pressure rolls 67 rotatably mounted at the ends of pivoted arms 68 supported for movement about an axis 69. From the rolls 67 the belts 65 pass about rolls 70 rotatable about the axis 69, then to a roll 71 and then back around the roll 29.

The transfer belts 65 preferably comprise resilient garter springs which yieldably urge the stream against the transfer drum 66 and which may stretch with varying thicknesses in the stream passing between the transfer belts and the transfer drum. The transfer belts are adapted to yieldably maintain the stream against the transfer drum while permitting longitudinal adjustment of individual sheets relative to each other as the stream is curved around the transfer drum. At the same time, the resilient transfer belts yieldably maintain the pressure rolls 67 against the upper surface of the stream at the top of the drum without the need for separate belt tensioning means which would be required if the belts were not resilient. The relatively upright inclination of the tranfer reaches of the transfer belts adjacent the transfer station also facilitates longitudinal displacement of individual sheets relative to each other as the stream is curved about the transfer drum without unduly binding the individual sheets against relative adjustment, as may occur if too great a length of the stream is tightly held about a greater arcuate portion of the transfer drum 66.

The transfer drum 66 and the rolls 67, 70 and 71 are all supported on a suitable framework in turn supported upon the outboard ends of the parallel arms 35. Such framework preferably comprises a pair of upright, spaced parallel side plates 75 rigidly secured in spaced relationship as illustrated. The plates 75 are provided with bearings for rotatably supporting the transfer drum 66, the shaft 69 and the roll 71. Each of the side plates 75 has a pair of spaced downwardly open notches 76 (FIG. 1) which fit over a pair of rigid cross rods 39 and 77 that interconnect the outboard ends of the arms 35 so that the framework rests upon and is supported by said cross rods. The described construction of the framework facilitates its mounting on existing machines which already have conveyors such as 18 and arms such as 35.

At the top, the side plates 75 are provided with upwardly opening slots as at 79, respectively, for receiving bearings 80 which rotatably support a positively driven feedroll 82 that engages the top of the inverted stream of sheets and is capable of movement up and down in the slots 79 to accommodate varying thicknesses in the stream.

Figure 7:
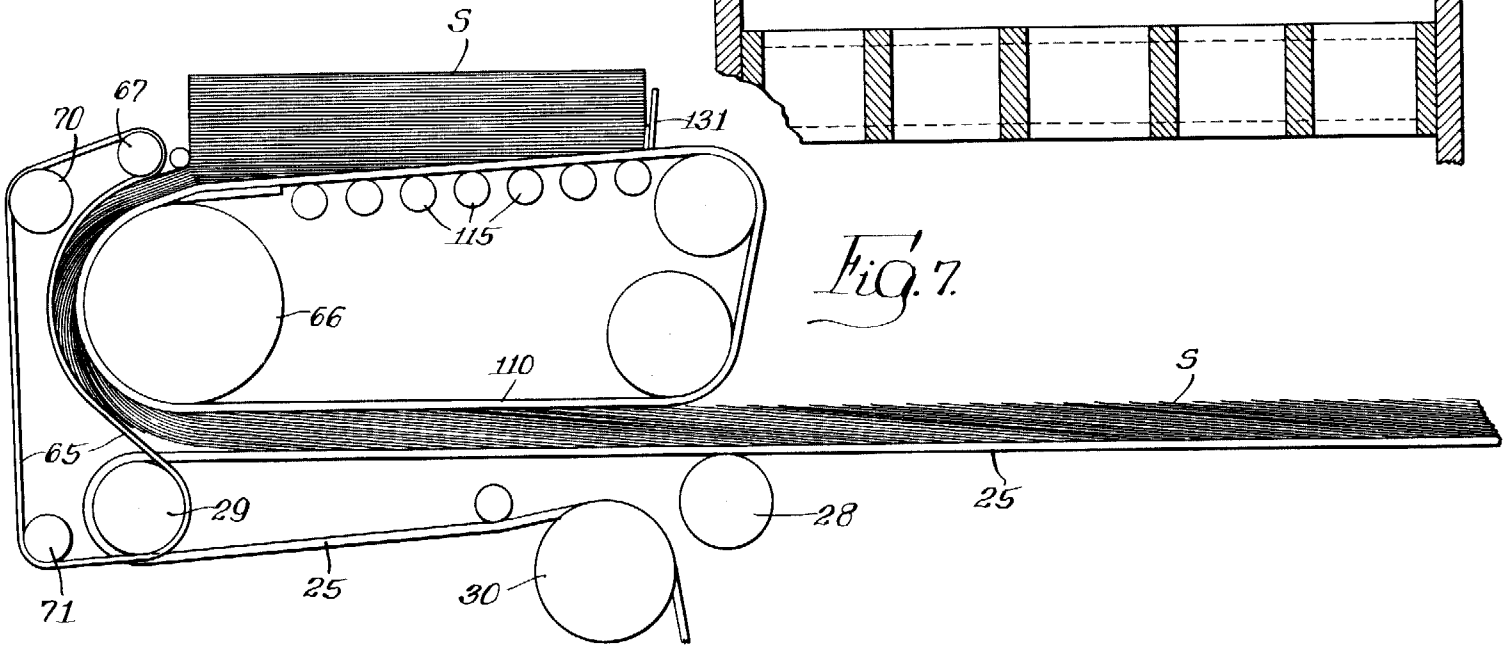
FIG. 7 is a fragmentary diagrammatic side elevational view illustrating a shingled stream of sheets or signatures and the path taken by such stream in the preferred and alternative embodiments of the apparatus illustrated.

The feedroll 82 is biased downwardly toward the transfer drum 66 by means including members 83 on opposite ends of the roll shaft, and a pair of cables 84 each has one end secured to a member 83 and its opposite end attached to one of a pair of rods 85 which are slidably mounted in brackets 86 on outer sides of the side plates 75. Each of the rods 85 is encircled by a compression spring 88 which is compressed between the left hand bracket 86 (FIGS. 1 and 2) and a stop nut 89 on the rod, so as to urge the rod toward the right. The cables 84 pass downwardly from the members 83, around pulleys 90 rotatably mounted on the outer sides of the plates 75, and thence to their connections with the slidable rods 85. In this fashion, the force of the springs 88 is transmitted through the cables 84 to bias the feedroll 82 downwardly toward the transfer drum 66 and substantially into engagement with the drum in the event that there are no sheets passing through the apparatus. In use, when a stream of shingled sheets is delivered to the transfer belts 65, the belts support the stream against the drum 66 and the feedroll 82 is moved upwardly by an amount determined by the thickness of the stream as it passes toward the stacking area, as illustrated in FIGURE 7 for example.

Figure 2:
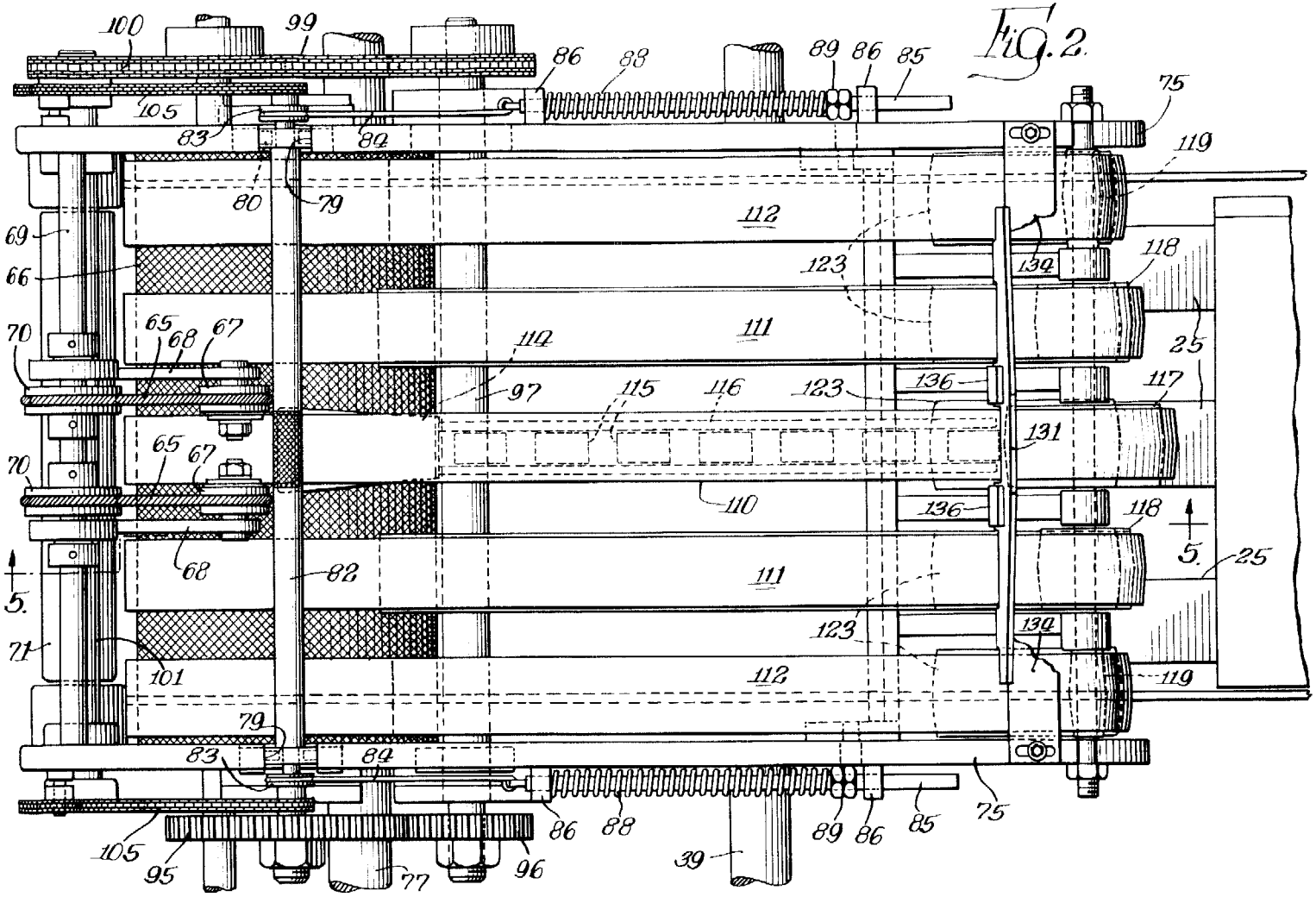
FIG. 2 is an enlarged fragmentary top plan view of the preferred embodiment of the stacking apparatus illustrated in FIG. 1.
Figure 3:
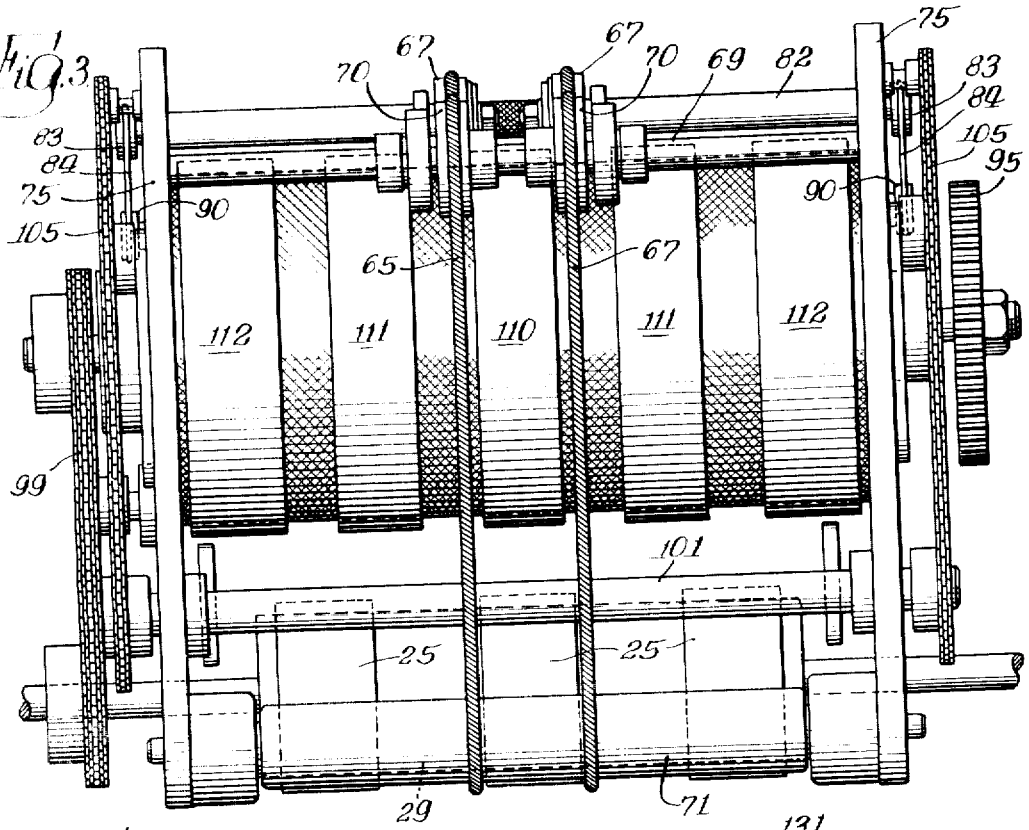
FIG. 3 is an end elevational view taken from the left end of FIG. 2.
Figure 4:
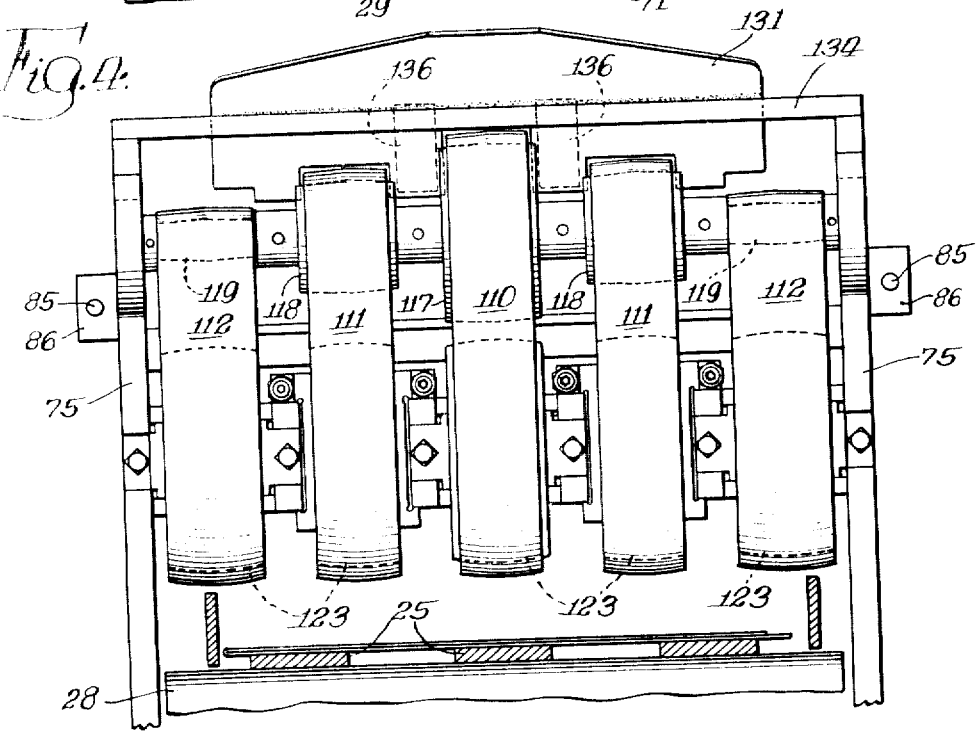
FIG. 4 is an elevational view, taken from the right of FIG. 2.
Figure 5:
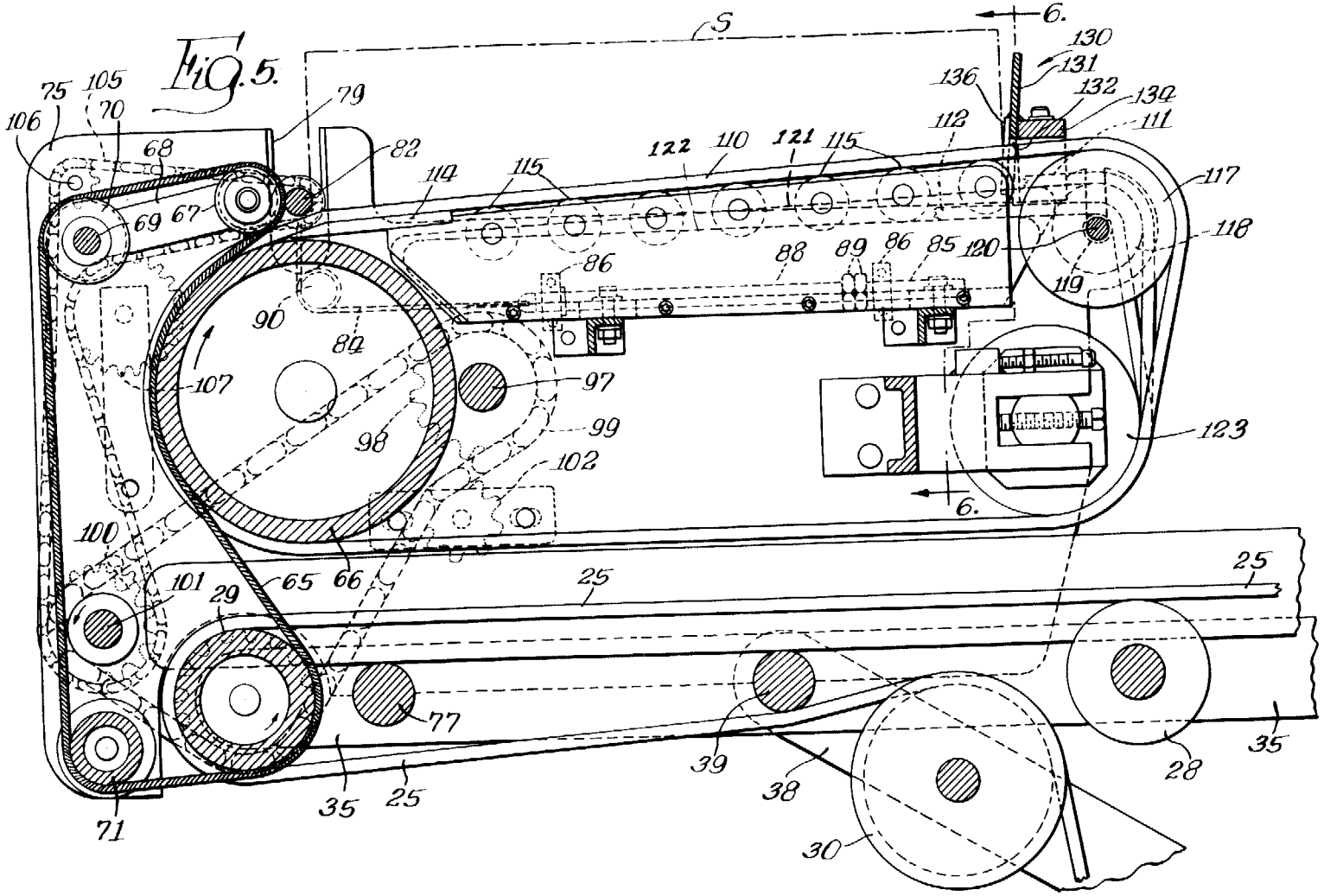
FIG. 5 is a fragmentary longitudinal sectional view taken at about the line 5—5 of FIG. 2.

It is apparent from FIG. 5 that the feedroll 82 is substantially in contact with the rear of the stack S, and that the lowermost point 82a of the feedroll is in contact with the incoming signatures along a line very close to the stack. Likewise, as seen in FIG. 2 the feedroll has a central knurled area 82b which increases its frictional engagement with the signatures.

The transfer belts 65 are driven in a direction to continue the advance of the shingled stream of sheets from the conveyor 18 toward the transfer drum 66 by means including the roll 29 about which the belts pass and which, as previously noted, is driven positively by a chain and sprocket drive. The transfer drum 66 is positively driven by means including a large pinion gear 95 (FIG. 1) fixed for rotation with the drum and meshing with a drive gear 96 on the end of a drive shaft 97. The shaft 97 is provided, at the opposite end from the gear 96, with a drive sprocket 98 (FIG. 5) fixed thereon for rotation therewith and having trained thereabout a drive chain 99 which also passes about a drive sprocket fixed for rotation with the driven conveyor roll 29. The chain 99 also passes about an idler sprocket 100 on a shaft 101 and a slack takeup sprocket 102. The feedroll 82 above the transfer drum 66 is driven by chains 105 at opposite ends of the feedroll, passing about sprockets provided on the feedroll shaft and also passing around drive sprockets on the shaft 101. Between the shaft 101 and the feedroll 82, the chains 105 pass around idler sprockets 106 and 107.

In passing about the transfer drum 66, the shingled stream of sheets is inverted and delivered to stacker belts including a center belt 110, a pair of flanking belts 111 and a pair of outer belts 112. The upper reach of the center belt 110 is inclined upwardly in the direction of signature advance, the upper reaches of the flanking belts 111 are inclined upwardly in the direction of signature advance at a smaller angle than the center belt 110, and the outer belts 112 include upper reaches which are generally horizontally disposed. Each of the stacker belts 110, 111 and 112 passes about the transfer drum 66.

Figure 6:
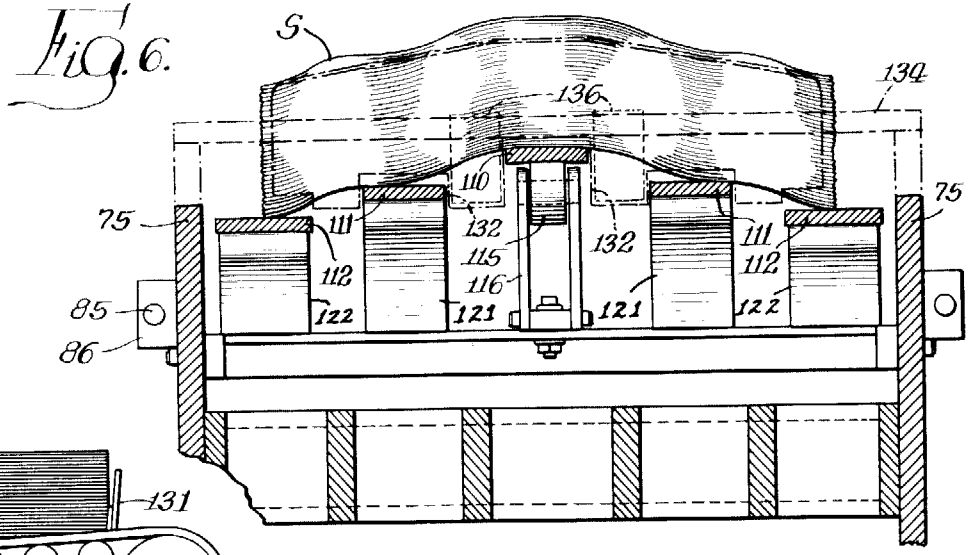
FIG. 6 is a fragmentary vertical sectional view taken at about the line 6—6 of FIG. 5.

On leaving the transfer drum 66, the center belt 110, which supports a major portion of the weight of the stack of sheets which forms in the stacking area, passes over a fixed guide member as at 114 and then over a series of idler rolls 115 which are supported an bracket means 116 (FIG. 6). After the rolls 115, the center belt passes over an idler roll 117. After the transfer drum 66, the flanking belts 111 pass over elongate upper reach supports 121 and idler rolls 118, and the outer belts 112 pass over elongate supports 122 and idler rolls 119. The idler rolls 117, 118 and 119 are journalled on a shaft 120 having opposite ends supported in the side plates 75. Roll 117 is of a relatively large diameter, rolls 118 are of relatively smaller diameter and rolls 119 are of still smaller diameter in order to provide the relative inclination of the belts 110, 111, and 112. After passing over the idler rolls 117, 118 and 119, the belts pass over individually adjustable takeup rolls 123 and thence back to the transfer drum 66.

The arrangement of the upper reaches of the stacker belts 110, 111 and 112 is such that, immediately upon leaving the transfer drum 66, the advancing inverted shingled stream of sheets is progressively bent or arched transversely of the direction of its motion by virtue of the relatively high plane of the center belt 110, the relatively lower plane of the flanking belts 111 and the still lower plane of the outer belts 112. This serves to strengthen the shingled stream and the individual sheets therein longitudinally so as to reduce the likelihood that the sheets will buckle when relative movement occurs between the individual sheets as the stack forms. The provision of moving belts for supporting the entire area of the stacked sheets reduces the likelihood of binding and wrinkling or individual sheets when the stack becomes relatively heavy, as compared to an arrangement where portions of the sheets at the bottom of the stack move over fixed supporting members.

The sheets are arrested by successively abutting against a stop means 130 arranged above the belts 110, 111, and 112, which causes a vertical stack S of signatures to form on the belts by underfeeding of signatures onto the bottom of the stack. The leading edges of the sheets in the stack are aligned by virtue of engagement with the stop means, and because the sheets are of equal length the trailing edges are also aligned.

The stop means 130 preferably comprises a plate 131 extending transversely of the path of the stream and includes downwardly open notches 132 (FIG. 6) for receiving the upper reaches of the stacker belts so that depending portions of the plate extend downwardly between the stacker belts to insure arrest of the advancing signatures. The plate 131 is welded or otherwise secured to a cross bar 134 having opposite ends attached to the side plates 75. The stop plate 131 is preferably inclined upwardly and forwardly, as seen in FIGS. 5 and 7, so that only the lowermost sheets in the stack engage the stop plate, thereby minimizing friction that would tend to retard the rise of the stack. To further minimize such friction the stop plate 131 may include projecting, laterally spaced inserts 136 which engage only relatively limited laterally extending portions of the leading edges of the sheets rather than the entire lateral extent of the leading edges. As best seen in FIG. 5, such inserts also are preferably inclined upwardly and forwardly. While the preferred construction includes both the features of inclining the stop plate and utilizing projecting inserts of relatively limited lateral extent, it will be understood that either of these structures may be utilized separately.

After the sheets in the stream have been aligned by the side joggers means as described at 56 and 57, there is substantially no tendency of these sheets to become misaligned laterally during travel on the conveyor belts 25 and the transfer belts 65, so that the side edges remain aligned until stacking. Thus, with the lateral edges aligned by the jogger means and the leading and trailing edges aligned by the stop means, all four edges of the sheets in a stack are aligned without the need of guide means except where the stop means engages the leading edges of the lowermost sheets in the stack.

It will be understood, of course, that the stacker is also adapted for use with signatures which may be folded along the leading or trailing edges rather than along the side edges.

It is apparent from the foregoing description of the operation of the stacker, and particularly from an examination of FIG. 7 of the drawings, that when forward motion of any given sheet is arrested by abutment with the stop 130 the shingled sheets beneath it provide a wedge which continues to move forward on the belts 110, 111 and 112. The feedroll 82 presses the shingled sheets firmly against the belts so as to compress the wedge where it enters beneath the rear of the stack; and rotation of the feedroll in contact with the projecting trailing edge portion of the top sheet in the shingled stream entering the stack pushes said top sheet positively forward and assists in breaking the frictional resistance between the lowermost arrested sheet in the stack and said top sheet in the shingled stream.

The foregoing analysis makes it apparent that the diameter of the feedroll 82 should be very small, so that there is the least possible space between the rear of the stack and the line along which the feedroll 82 bears upon the projecting trailing edge of a sheet being moved into the stack. Ideally the feedroll would be contact with the sheet entering the stack until the sheet abuts the stop, but this is obviously impossible unless the feedroll has substantially zero radius. Since the feedroll must be quite rigid so as not to flex under the tension applied to its ends, it must be of large enough diameter to have the required rigidity.

Figure 8:
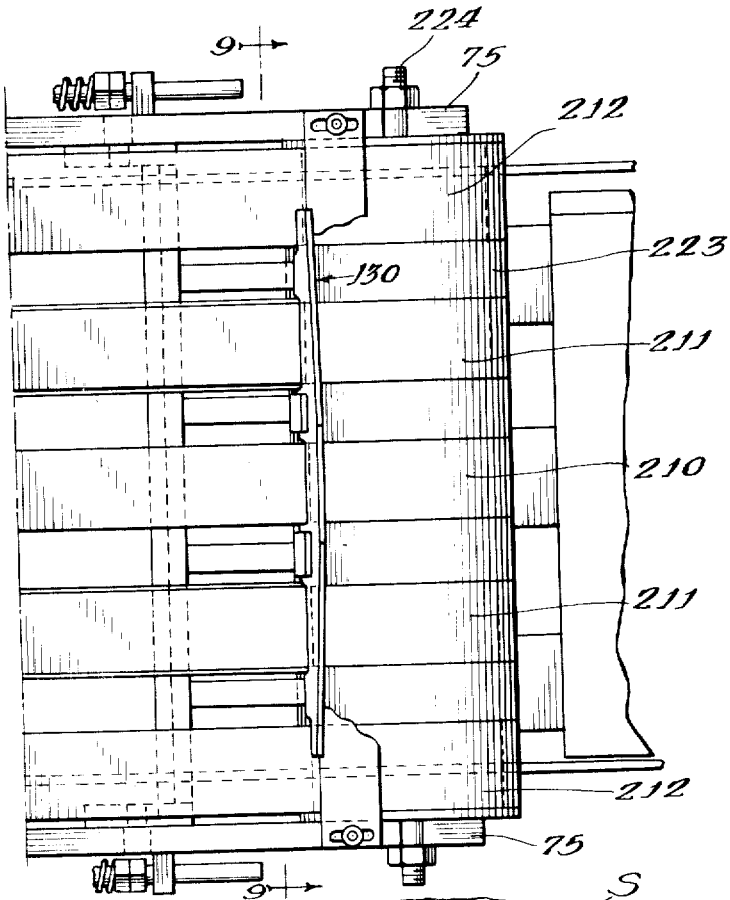
FIG. 8 is a fragmentary plan view of the alternative embodiment of the invention, showing only that part of the apparatus which corresponds to the right hand portion of FIG. 2.
Figure 9:
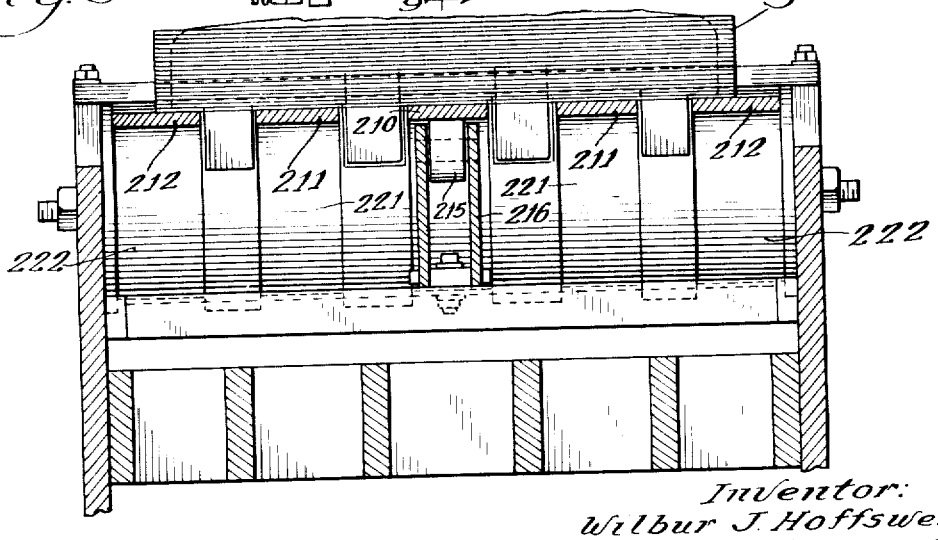
FIG. 9 is a section taken substantially as illustrated along the line 9—9 of FIG. 8, and is comparable to FIG. 6.

Referring now to FIGS. 8 and 9, the alternative embodiment of the invention is identical with the preferred embodiment except that, as seen in FIG. 9, a center belt 210, a pair of flanking belts 211 and a pair of outer belts 212 are all in the same plane, so that the sheets are not arched longitudinally in the stacking area. As illustrated in FIG. 9, the belt 210 is supported upon a set of idler rollers 215 carried in brackets 216; while the flanking belts 211 are carried upon fixed supports 221 and the flanking belts 212 are carried upon fixed supports 222. Alternatively, of course, supporting rollers similar to the rollers 115 may be provided for the belts 211 and 212, in place of the fixed supports.

As best seen in FIG. 8, all five of the belts are carried upon a grooved drum 223 which is journaled upon a cross-rod 224 that is supported in the side plates 75 of the frame. The alternative embodiment of the invention includes stop means, indicated generally at 130, which is identical with that in the preferred embodiment and thus is not described in detail. In all other respects, the alternative embodiment is identical with the preferred embodiment.

The foregoing detailed description is given for clearness of understanding only, and no unnecessary limitations should be understood therefrom, for some modifications will be obvious to those skilled in the art.

I claim:

1. A method of stacking paper sheets, comprising: arranging the sheets in a shingled stream with the leading edge of each sheet beneath the immediately preceding sheet and the trailing edge portion of each sheet extending behind the trailing edge of said preceding sheet; advancing said shingled stream in a predetermined path; successively arresting the advancing sheets in said shingled stream when their leading edges reach a predetermined point in said path and the sheets are generally horizontally disposed, so that each sheet slides beneath the generally horizontally disposed sheets ahead of it after the advance of the last preceding sheet is arrested, thereby forming an upright stack in which the sheets are generally horizontal and the leading edges of the sheets are substantially aligned in a plane that is generally perpendicular to the plane of the sheets in the stack; and applying a feeding force from above to the projecting trailing edge portion of each sheet at the rear edge of the stack when the advance of the immediately preceding sheet is arrested, said feeding force cooperating with the force that is advancing the stream so as to drive each sheet positively under the stack and toward said vertical plane.

2. The method of claim 1 in which the stream is compressed as the feeding force is applied.

3. The method of claim 2 in which the sheets in the stream are effectively constantly and completely supported from below as they are advanced and as their advance is arrested.

4. The method of claim 3 which includes the step of bending the sheets in the advancing stream transversely so that each sheet is rigidified longitudinally at the time its advance is arrested.

5. The method of claim 1 in which the sheets in the stream are effectively constantly and completely supported from below as they are advanced and as their advance is arrested.

6. The method of claim 1 which includes the step of bending the sheets in the advancing stream transversely so that each sheet is rigidified longitudinally at the time its advance is arrested.

7. The method of claim 1 which includes the step of bumping the lateral edges of the sheets in the shingled stream to jog them into longitudinal alignment.

8. A method of stacking paper sheets, comprising: arranging the sheets in a shingled stream with the leading edge of each sheet overlying the immediately preceding sheet and the trailing edge portion of each sheet extending behind the trailing edge portion of said preceding sheet; advancing said shingled stream in a path which is arcuate in a vertical plane to invert said stream and reverse its direction of movement, whereby each sheet in the stream has its leading edge beneath the immediately preceding sheet, said path being generally horizontal after the stream is inverted; successively arresting the advancing sheets in said shingled stream when their leading edges reach a predetermined point in said path and the sheets are generally horizontally disposed, so that each sheet slides beneath the generally horizontally disposed sheets ahead of it after the advance of the last preceding sheet is arrested, thereby forming an upright stack in which the sheets are generally horizontal and the leading edges of the sheets are substantially aligned in a vertical plane; and applying a feeding force from above to the projecting trailing edge portion of each sheet at the rear edge of the stack when the advance of the immediately preceding sheet is arrested, said feeding force cooperating with the force that is advancing the stream so as to drive each sheet positively under the stack and toward said vertical plane.

9. The method of claim 8 which includes the step of bumping the lateral edges of the sheets in the shingled stream to jog them into longitudinal alignment before the stream advances through the arcuate path.

10. The method of claim 8 in which the stream is compressed as the feeding force is applied.

11. The method of claim 8 in which the sheets in the stream are effectively constantly and completely supported from below as they are advanced and as their advance is arrested.

12. The method of claim 8 which includes the step of bending the sheets in the advancing stream transversely so that each sheet is rigidified longitudinally at the time its advance is arrested.

13. Apparatus for stacking paper sheets comprising, in combination: means for arranging continuously delivered sheets in a shingled stream in which the leading edge of each sheet is beneath the immediately preceding sheet and the trailing edge portion of each sheet extends behind the trailing edge of said preceding sheet; generally horizontal conveyor means on which said stream is advanced with the sheets generally horizontally disposed, said conveyor means extending effectively continuously from the area in which the shingled stream is arranged and supporting the shingled stream effectively constantly and completely during the formation of a stack; a stop associated with the conveyor means for successively arresting the advancing generally horizontally disposed sheets in the stream with their leading edges substantially aligned in an upright plane that is generally perpendicular to the plane of the conveyor means, so that each sheet slides beneath the sheets ahead of it after the advance of the last preceding sheet is arrested, thereby building an upright stack in which the sheets are generally horizontal; a feedroll spaced slightly above the conveyor means, said feedroll bearing vertically upon and frictionally engaging the projecting trailing edge portion of each sheet immediately adjacent the rear of the stack; and means rotating said feedroll to apply a feeding force to each sheet which cooperates with the force applied by the advance of the conveyor means so as to drive each sheet positively under the stack and against the stop.

14. The apparatus of claim 13 which includes means for compressing the stream as it enters the stack.

15. The apparatus of claim 13 which includes means continuously urging the feedroll downwardly to compress the stream and increase the frictional engagement between the feedroll and each sheet.

16. The apparatus of claim 13 which includes means associated with the conveyor means to bend the advancing stream of sheets transversely so that each sheet is rigidified longitudinally as it strikes the stop.

17. The apparatus of claim 16 in which the conveyor means comprises a plurality of laterally adjacent carrier belts including a center belt and flanking belts, center belt support means maintaining the center belt substantially in a plane, and flanking belt support means that is inclined in a vertical plane with respect to the center belt, whereby the lateral margins of the sheets in the shingled stream are bent out of the plane of the center belt.

18. The apparatus of claim 17 which includes five belts, with flanking belts and outer belts and in which the support means for the outer belts are inclined at a sharper angle than the support means for the flanking belts.

19. The apparatus of claim 13 in which the stop is inclined upwardly and in the direction of sheet advance so that only the leading edges of the lowermost sheets in the stack engage the stop.

20. The apparatus of claim 13 in which the stop has a pair of laterally spaced lugs projecting toward the advancing stream so that the sheets engage only said lugs to minimize friction between the rising stack and the stop.

21. The apparatus of claim 20 in which the stop is inclined upwardly and in the direction of sheet advance so that only the leading edges of the lowermost sheets in the stack engage the stop.

22. Apparatus for stacking paper sheets comprising, in combination: conveyor means including a plurality of coplanar parallel conveyor belts; means for delivering sheets onto said belts in a shingled stream with the leading edge of each sheet overlying the immediately preceding sheet and the trailing edge portion of each sheet extending behind the trailing edge of the preceding sheet; driven means cooperating with said belts to maintain the sheets in shingled relationship while the belts traverse an arcuate path in a vertical plane to invert the stream and reverse its direction of travel, said driven means including generally horizontal stacker belts on which the shingled stream is continuously supported and advanced in said reverse direction with the sheets generally horizontally disposed; a stop associated with the stacker belts for successively arresting the advancing, generally horizontally disposed sheets in the stream on the stacker belts with their leading edges substantially vertically aligned, so that each sheet slides beneath the sheets ahead of it after the advance of the last preceding sheet is arrested, thereby building an upright stack in which the sheets are generally horizontally disposed; a feedroll spaced slightly above the stacker belts, said feedroll bearing vertically upon and frictionally engaging the projecting trailing edge portion of each sheet immediately adjacent the rear of the stack; and means rotating said feedroll to apply a feeding force to each sheet which cooperates with the force applied by the advance of the stacker belts so as to drive each sheet positively under the stack and against the stop.

23. The apparatus of claim 22 in which the driven means includes a drum, and in which the conveyor means includes rollers positioned to confine the shingled stream between the conveyor belts and the drum.

24. The apparatus of claim 22 which includes means continuously urging the feedroll downwardly to compress the stream and increase the frictional engagement between the feedroll and each sheet.

25. The apparatus of claim 22 in which the stacker belts include a center belt and flanking belts, center belt support means maintaining the center belt substantially in a plane, and flanking belt support means that is inclined in a vertical plane with respect to the center belt, whereby the lateral margins of the sheets in the shingled stream are bent out of the plane of the center belt.

26. The apparatus of claim 25 which includes five belts, with flanking belts and outer belts and in which the support means for the outer belts are inclined at a sharper angle than the support means for the flanking belts.

27. A method of stacking paper sheets, comprising: arranging the sheets in a shingled stream with their side edges substantially aligned and the leading edge of each sheet beneath the immediately preceding sheet and the trailing edge portion of each sheet extending behind the trailing edge of said preceding sheet, so that the leading portions of any group of sheets in the stream form a long, thin, wedge-like mass; advancing said shingled stream in a predetermined path; compressing the stream transversely at a predetermined point in said path while continuing to advance said stream past said compression point with the sheets generally horizontally disposed; successively arresting the advancing sheets in the stream at a point where their trailing edges have advanced very slightly past the compression point and the sheets are generally horizontally disposed, while continuing to advance the stream to the point of arrest, so that each generally horizontally disposed sheet slides beneath the sheets ahead of it until it is arrested with its leading edge substantially in the same vertical plane with the leading edges of all preceding sheets.

28. The method of claim 27 in which a feeding force is applied to the stream from above at the point of compression.

29. Apparatus for stacking paper sheets comprising, in combination: means for arranging continuously delivered sheets in a shingled stream in which the leading edge of each sheet is beneath the immediately preceding sheet and the trailing edge portion of each sheet extends behind the trailing edge of said preceding sheet so that the leading portions of any group of sheets in the stream form a long, thin, wedge-like mass; generally horizontal conveyor means on which said stream is supported from below and advanced with the sheets generally horizontally disposed; a small diameter compression roll slightly above, and extending transversely of the conveyor means; means urging said compression roll against the shingled stream on the conveyor means to compress the stream; and a stop associated with the conveyor means very slightly more than one sheet length downstream from the compression roll, said stop successively arresting the advancing, generally horizontally disposed sheets in the stream with their leading edges substantially vertically aligned, so that each sheet slides beneath the sheets ahead of it after the advance of the last preceding sheet is arrested, thereby building an upright stack in which the sheets are generally horizontal.

30. The apparatus of claim 29 which includes means for positively rotating the compression roll to apply to the projecting trailing edge portion of each sheet a feeding force which cooperates with the advancing conveyor means to drive each sheet positively under the stack and against the stop.

*31. A method of stacking paper sheets with their end edges in generally upright approximate alignment, said method comprising: continuously forming said sheets into a shingled stream with the leading edge of each sheet beneath the immediately preceding sheet and the trailing edge portion of each sheet extending behind the trailing edge of said preceding sheet; effectively constantly and completely supporting said shingled sheets while moving them into abutment with a stop to form a generally upright stack while continuously compressing said shingled sheets as they enter said stack, said shingled sheets being continuously urged forwardly beneath said forming stack toward said stop.*

*32. Apparatus for stacking paper sheets with their end edges in generally upright approximate alignment, said apparatus comprising: means for continuously forming said sheets into a shingled stream with the leading edge of each sheet beneath the immediately preceding sheet and the trailing edge portion of each sheet extending behind the trailing edge of said preceding sheet; generally horizontal conveyor means for effectively constantly and completely supporting and moving said shingled sheets; a stop above the conveyor means in the path of movement of said shingled sheets for forming said sheets into a stack that is generally perpendicular to the plane of the conveyor means; and means for continuously compressing said shingled sheets against the conveyor means as they enter said stack, said conveyor means continuously urging said shingled sheets forwardly beneath said forming stack toward said stop.*

References Cited by the Examiner

The following references, cited by the Examiner, are of record in the patented file of this patent or the original patent.

UNITED STATES PATENTS

| | | | |
|---|---|---|---|
| 898,831 | 9/1908 | Casey | 271—49 X |
| 1,868,384 | 7/1932 | Greenwood | 271—87 |
| 2,053,315 | 9/1936 | Barnecott | 271—68 |
| 2,233,850 | 3/1941 | Rapley. | |
| 2,884,243 | 4/1959 | Stobb | 271—87 X |
| 2,963,177 | 12/1960 | Shields | 271—68 X |

M. HENSON WOOD, Jr., *Primary Examiner.*

A. N. KNOWLES, *Assistant Examiner.*